US012674510B2

(12) United States Patent
Rumple et al.

(10) Patent No.: US 12,674,510 B2
(45) Date of Patent: Jul. 7, 2026

(54) LUBRICATION SYSTEM FOR TRANSMISSION

(71) Applicant: ArvinMeritor Technology, LLC, Troy, MI (US)

(72) Inventors: Stephen W. Rumple, Birmingham, MI (US); Kevin Noens, Aurora, NY (US); Jerome M. Kunert, Shelbyville, MI (US); Derek C. Donnelly, Leonard, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 52 days.

(21) Appl. No.: 18/999,412

(22) Filed: Dec. 23, 2024

(65) Prior Publication Data

US 2026/0177142 A1     Jun. 25, 2026

(51) Int. Cl.
*F16H 57/04* (2010.01)
*F16K 15/06* (2006.01)

(52) U.S. Cl.
CPC ..... *F16H 57/0468* (2013.01); *F16H 57/0435* (2013.01); *F16K 15/063* (2013.01); *F16H 2700/00* (2013.01)

(58) Field of Classification Search
CPC .. F16H 57/0468; F16H 2700/00; F16K 3/184; F16K 3/205; F16K 31/52408; F16K 31/52416
See application file for complete search history.

(56) References Cited

U.S. PATENT DOCUMENTS 6,189,655 B1 *   2/2001   Scheib ................ F16H 57/0434
                                                             184/6.12
9,556,962 B2 *   1/2017   Kawasaki ......... F16K 31/52416

FOREIGN PATENT DOCUMENTS

KR        19980034448 U      9/1998
KR        101468564 B1      12/2014

* cited by examiner

*Primary Examiner* — Minh Truong
*Assistant Examiner* — Mark K Buse
(74) *Attorney, Agent, or Firm* — Dickinson Wright PLLC

(57) ABSTRACT

A method of lubricating a transmission system including: scavenging, via a lubrication tube of a lubrication system disposed within the transmission system, oil from at least one of a plurality of gears; directing the scavenged oil from the lubrication tube to a plurality of oil conduits extending from the lubrication tube; and translating a shift assembly in a longitudinal direction such that the shift assembly actuates a plurality of poppet valve assemblies disposed in the plurality of oil conduits between a closed position and an open position. The scavenged oil circumventing the plurality of poppet valve assemblies in the open position and the plurality of poppet valve assemblies form a seal with the plurality of oil conduits in the closed position.

20 Claims, 4 Drawing Sheets

LUBRICATION SYSTEM FOR TRANSMISSION

TECHNICAL FIELD

The present disclosure relates to lubrication systems for transmission systems, and more particularly, to lubrication systems for automotive transmissions with integrated brake systems.

BACKGROUND

In conventional transmission systems, lubrication systems may be configured to deliver oil to various components, including bearings and shift collars, through a centralized channel within a main shaft of the transmission. However, in transmission systems in which other components, such as braking systems, are integrated into the main shaft of the transmission, the space typically used for oil delivery may be occupied. As traditional lubrication systems rely on unobstructed pathways through the main shaft of the transmission to ensure consistent and sufficient oil flow to bearings, integration of other components into the transmission may lead to insufficient lubrication, thereby causing increased wear, reduced efficiency, and potential component failure.

SUMMARY

According to one embodiment, a lubrication system for a transmission assembly is provided. The lubrication system may include a lubrication tube, a plurality of oil conduits, a plurality of poppet valve assembles, and a shift assembly. The plurality of oil conduits may extend from and be in fluid communication with the lubrication tube. At least one of the plurality of poppet valve assemblies may be disposed in each of the plurality of oil conduits. The shift assembly may include a shift shaft and a cam mechanism, the shift shaft may be translatable in a longitudinal direction and the cam mechanism may be disposed about the shift shaft. The cam mechanism of the shift assembly may be configured to engage each of the plurality of poppet valve assembles to actuate each of the plurality of poppet valve assemblies between a closed position and an open position.

According to another embodiment, a transmission assembly is provided. The transmission assembly may include a transmission housing and a lubrication system that may be disposed within the transmission housing. The transmission housing may define a transmission shaft that may extend at least partially through the transmission housing. The lubrication system may include a lubrication tube, a plurality of oil conduits, a plurality of poppet valve assemblies, and a shift assembly. At least one of the plurality of poppet valve assemblies may be disposed in each of the plurality of oil conduits. The shift assembly may be configured to translate in a longitudinal direction relative to the plurality of oil conduits. The shift assembly may be configured to engage each of the plurality of poppet valve assemblies to actuate each of the plurality of poppet valve assemblies between a closed position and an open position.

According to yet another embodiment, a method of lubricating a transmission system is provided. The method may include: scavenging, via a lubrication tube of a lubrication system disposed within the transmission system, oil from at least one of a plurality of gears; directing the scavenged oil from the lubrication tube to a plurality of oil conduits extending from the lubrication tube; and translating a shift assembly in a longitudinal direction such that the shift assembly actuates a plurality of poppet valve assemblies disposed in the plurality of oil conduits between a closed position and an open position. The scavenged oil may circumvent the plurality of poppet valve assemblies in the open position and the plurality of poppet valve assemblies form a seal with the plurality of oil conduits in the closed position.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

Other features and advantages of the present disclosure will be understood from the following embodiments described in detail herein and with reference to the accompanying drawings, in which like reference numerals represent the same or similar components.

DETAILED DESCRIPTION

Figure 1:
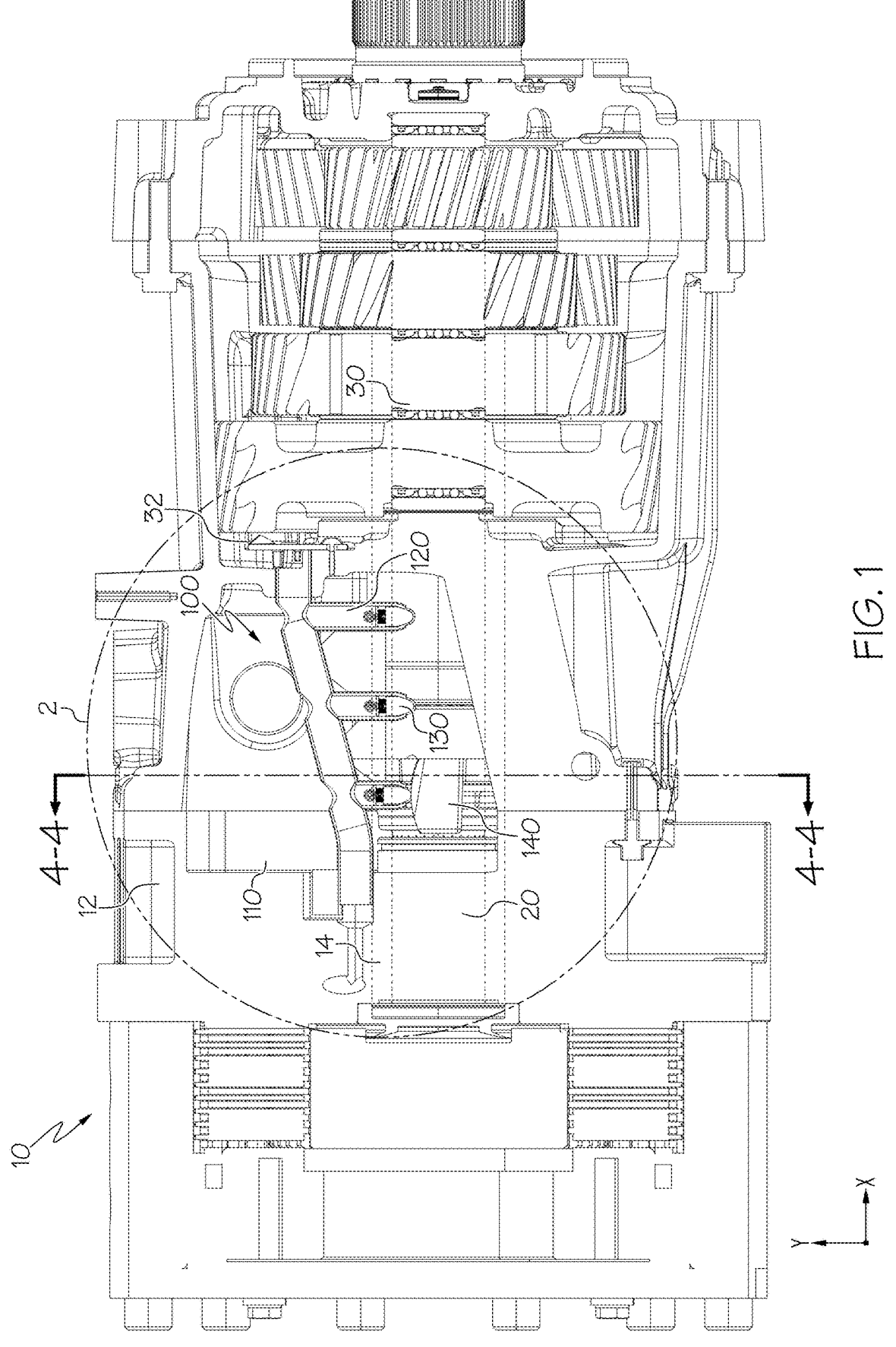
FIG. 1 is a sectional view of a transmission assembly, according to one or more embodiments shown and described herein.

In the embodiments described herein, a lubrication system for a transmission is disclosed. The lubrication system includes a lubrication tube in fluid communication with at least one of a plurality of gears, a plurality of oil conduits extending from and in fluid communication with the lubrication tube, a plurality of poppet valve assemblies disposed in each of the plurality of oil conduits and a shift assembly including a shift shaft translatable in a longitudinal direction and a cam mechanism disposed about the shift shaft. The cam mechanism of the shift assembly is configured to engage each of the plurality of poppet valve assemblies to actuate each of the plurality of poppet valves between a closed position and an open position. By utilizing the cam mechanism of the shift assembly to selectively translate the plurality of poppet valve assemblies from the closed position to the open position (e.g., to facilitate lubrication of various gears and/or other components as needed during operation of the transmission), the disclosed lubrication system reduces oil waste while also addressing spatial issues arising from incorporating additional components (e.g., brake assemblies, etc.) into the transmission.

It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

As described hereinabove, the integration of various components, such as brake systems, into a main shaft of a transmission system may obstruct the pathways traditionally used by lubrication systems to deliver oil to bearings and other transmission components. Furthermore, existing lubrication systems may also lack precise flow control, delivering oil indiscriminately to all potential pathways, and resulting in oil waste, reduced efficiency, and insufficient lubrication of various components within the transmission system.

The disclosed lubrication system aims to address these shortcomings by providing a lubrication system that scavenges oil from transmission gears and delivers the scavenged oil to the bearings and shifters of the transmission through a series of oil conduits. Each of the oil conduits may be further equipped with poppet valve assemblies that remain closed until activated by a shift assembly, such as a shift collar, which ensures that oil is delivered only to components within the transmission system that require lubrication. In the embodiments described herein, the shift assembly may further include a cam profile that engages the plurality of poppet valve assemblies to ensure precise flow control, which acts to conserve oil while also providing effective lubrication of all active components within the transmission system.

It should be further appreciated that the lubrication system described herein may also resolve the spatial constraint issues introduced by integrating additional components, such as a brake assembly, into the transmission, while also improving the overall reliability and efficiency of the lubrication system. For example, by ensuring lubrication is delivered only where needed throughout the transmission system, the disclosed lubrication system minimizes oil waste, optimizes component performance, and extends the lifespan of the transmission system.

Embodiments of lubrication systems will now be described in additional detail herein. The following will now describe these lubrication systems in detail with reference to the drawings and where like numbers refer to like structures.

Referring now to FIG. 1, a transmission assembly 10 is depicted. The transmission assembly 10 may include a transmission housing 12 defining a transmission shaft 14 that extends in a longitudinal direction (e.g., in the +/−x-direction as depicted in FIG. 1) at least partially through the transmission housing 12. In these embodiments, a brake assembly 20, such as a parking brake assembly including an e-axle, may be disposed within and extend through the transmission shaft 14.

As further depicted in FIG. 1, the transmission assembly 10 may also include a plurality of bearings 30 and a plurality of gears 32, which may be disposed throughout the transmission housing 12 relative the transmission shaft 14. For example, in these embodiments, the transmission assembly 10 may include a plurality of transmission bearings, a plurality of shaft bearings, a plurality of brake bearings, and/or a plurality of shift assembly bearings, as will be described herein in additional detail with reference to FIGS. 2 and 4.

Referring still to FIG. 1, the transmission assembly 10 may further include a lubrication system 100, which may be positioned within the transmission housing 12 such that the lubrication system 100 is configured to scavenge oil from the plurality of gears 32, and dispense oil to the plurality of bearings 30 housed within the transmission assembly 10. For example, in these embodiments, the lubrication system 100 may extend in a longitudinal direction (e.g., in the +/−x-direction as depicted in the coordinate axis of FIG. 1), such that the lubrication system 100 runs at least partially in parallel with the transmission shaft 14. Accordingly, it should be understood that the lubrication system 100 may be positioned within the transmission housing 12 such that the lubrication system 100 may capture oil from the plurality of gears 32 while minimizing interference with other components of the transmission assembly 10 and/or brake assembly 20. Operation of the lubrication system 100 will be described in additional detail herein with reference to FIG. 2.

In the embodiments described herein, it should be further understood that the transmission assembly 10 may be an automotive transmission assembly, such as a transmission assembly utilized in an electric vehicle, hybrid vehicle, or any other similar commercial vehicle. However, in some embodiments, the transmission assembly 10 may be utilized in industrial machinery (e.g., forklifts, conveyor systems, etc.), heavy equipment (e.g., excavators, bulldozes, cranes, etc.), aircraft vehicles, autonomous vehicles, or any other similar type of vehicle and/or machinery without departing from the scope of the present disclosure.

Figure 2:
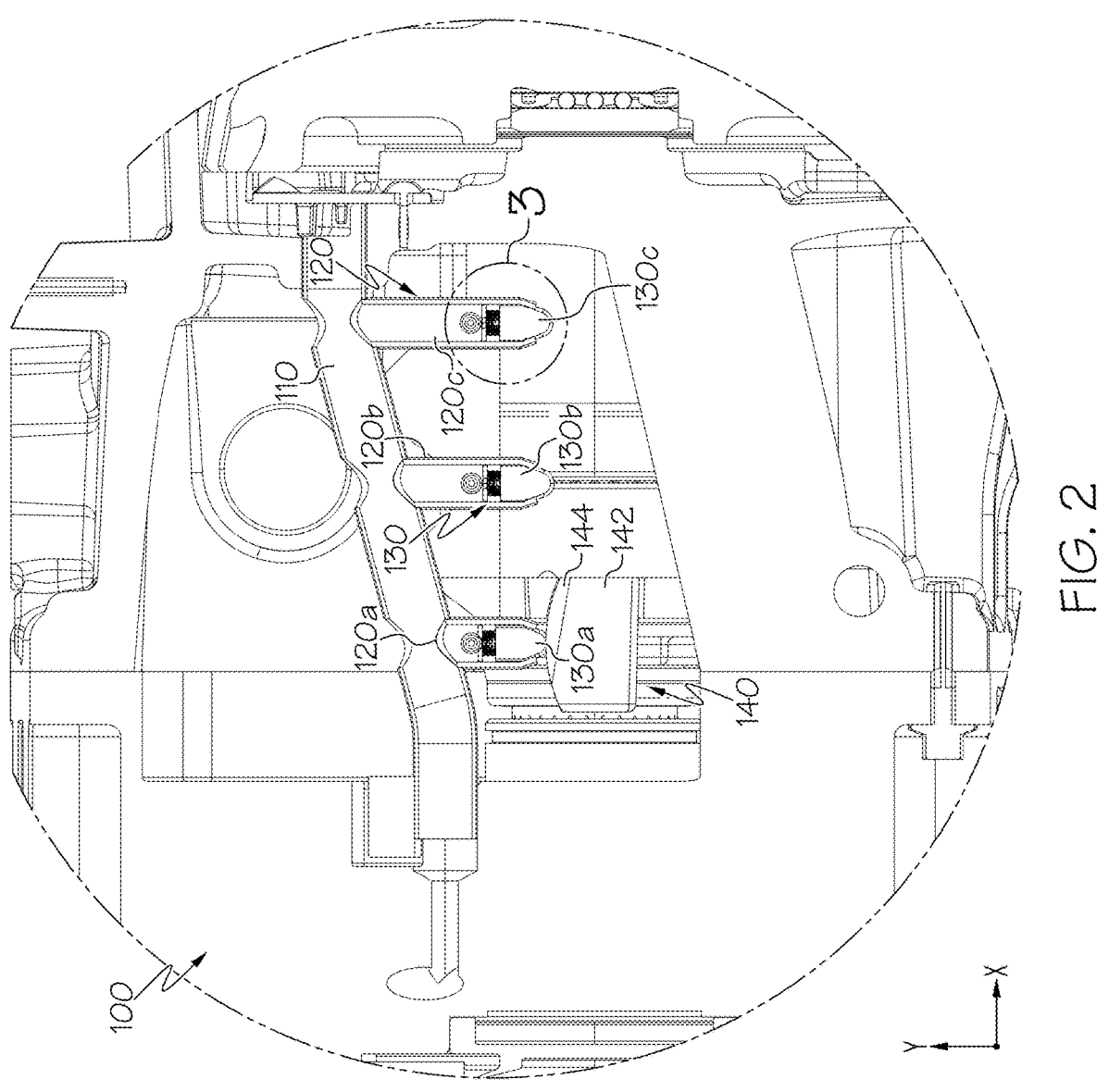
FIG. 2 is a schematic view of a lubrication system of the transmission assembly of FIG. 1, according to one or more embodiments shown and described herein.

Turning now to FIG. 2, the lubrication system 100 is depicted in additional detail. For example, as illustrated in FIG. 2, the lubrication system 100 may further include a lubrication tube 110 that extends in a longitudinal direction (e.g., in the +/−x-direction as depicted in the coordinate axis of FIG. 2) along the transmission shaft 14. In these embodiments, the lubrication tube 110 may be in fluid communication (e.g., fluidly coupled or otherwise) with at least one of the plurality of gears 32 located within the transmission housing 12, such that the oil utilized by the plurality of gears 32 may be scavenged by the lubrication tube 110 and redirected to other components of the transmission assembly 10.

As further depicted in FIG. 2, the lubrication system 100 may further include a plurality of oil conduits 120, which may extend laterally (e.g., in the +/−y-direction as depicted in the coordinate axis of FIG. 2) from the lubrication tube 110. In these embodiments, each of the plurality of oil conduits 120 may be in fluid communication (e.g., fluidly coupled or otherwise) with the lubrication tube 110, such that oil scavenged from the plurality of gears 32 by the lubrication tube 110 may be transferred to the plurality of oil conduits 120.

For example, in the embodiments described herein, the lubrication tube 110 may be sloped to facilitate gravity-assisted oil flow from the plurality of gears 32 to the plurality of oil conduits 120. In these embodiments, the lubrication tube 110 may be sloped such that oil scavenged from the plurality of gears 32 may flow downwardly (e.g., in the −x direction and the −y direction as depicted in the coordinate axis of FIG. 2) into each of the plurality of oil conduits 120. It should be appreciated that the slope of the lubrication tube 110 may aid in preventing oil pooling within the lubrication tube 110, thereby allowing for continuous supply of oil to the plurality of oil conduits 120. Furthermore, the angle of slope of the lubrication tube 110 may be configured to balance a flow rate (e.g., gravity flow rate) of oil traversing the lubrication tube 110 without generating excessive pressure drops. For example, in some embodiments, the slope of the lubrication tube 110 may be between 1 degree and 10 degrees, such as between 2 degrees and 5 degrees. Furthermore, in other embodiments, the lubrication tube 110 may include a gradient slope that increases and/or decreases across a length of the lubrication tube 110 as may be determined based on the orientation of the lubrication system 100 within the transmission housing 12.

Referring still to FIG. 2, the lubrication system 100 may further include a plurality of poppet valve assemblies 130, such that at least one of the plurality of poppet valve assemblies 130 is positioned within each of the plurality of oil conduits 120. For example, in the embodiments depicted in FIG. 2, the plurality of oil conduits 120 may include at least a first oil conduit 120a, a second oil conduit 120b, and a third oil conduit 120c. Similarly, the plurality of poppet valve assemblies 130 may include at least a first poppet valve 130a, a second poppet valve 130b, and a third poppet valve 130c. In these embodiments, the first poppet valve 130a may be disposed within the first oil conduit 120a, the second poppet valve 130b may be disposed within the second oil conduit 120b, and the third poppet valve 130c may be disposed within the third oil conduit 120c. Although the lubrication system 100 depicted in FIG. 2 is shown as including three oil conduits and three poppet valve assemblies, it should be understood that, in some embodiments, the lubrication system 100 may include any number of oil conduits and poppet valve assemblies without departing from the scope of the present disclosure. Operation of the plurality of poppet valve assemblies 130 will be described in additional detail herein with further reference to FIG. 3.

Referring still to FIG. 2, the lubrication system 100 may further include a shift assembly 140, such as a shift collar, which may be configured to engage with the plurality of poppet valve assemblies 130 and actuate the plurality of poppet valve assemblies 130 between a closed position and an open position. In the closed position, each of the plurality of poppet valve assemblies 130 may form a seal with the at least one of the plurality of oil conduits 120 in which the poppet valve assembly is disposed. For example, as illustrated in FIG. 2, the second poppet valve 130b may form a seal with the second oil conduit 120b when the second poppet valve 130b is in the closed the position. Accordingly, it should be appreciated that, when the plurality of poppet valve assemblies 130 are in the closed position, the seal formed between the plurality of poppet valves assemblies 130 may prevent oil from traversing the plurality of oil conduits 120, such that oil may remain upstream (e.g., in the +y-direction as depicted by the coordinate axis of FIG. 2) of the plurality of poppet valve assemblies 130.

As further depicted in FIG. 2, contact between the shift assembly 140 and each of the plurality of poppet valve assemblies 130 may cause the plurality of poppet valve assemblies 130 to be actuated from the closed position to the open position. For example, when the plurality of poppet valve assemblies 130 are actuated to the open position, oil situated upstream of the plurality of poppet valve assemblies 130 may be allowed to flow downstream (e.g., in the −y-direction as depicted in the coordinate axis of FIG. 2)

through and/or around the plurality of poppet valve assemblies 130 to various components (e.g., bearings, gears, etc.) of the transmission assembly 10, as will be described in additional detail herein.

Operation of the shift assembly 140 will now be described in additional detail with further reference to FIG. 2. For example, in these embodiments, the shift assembly 140 may further include a shift shaft 142, which may be configured to translate in a longitudinal direction (e.g., in the +/−x-direction as depicted in the coordinate axis of FIG. 2) and/or rotate within the transmission assembly 10 between a plurality of positions that each correspond to a location of each of the plurality of oil conduits 120 and each of the plurality of poppet valve assemblies 130. In these embodiments, the shift assembly 140 may further include a cam mechanism 144 disposed on the shift shaft 142, which may be configured to engage each of the plurality of poppet valve assemblies 130 as the shift shaft 142 translates in the longitudinal direction.

As depicted in FIG. 2, a profile of the cam mechanism 144 may be configured such that contact between the cam mechanism 144 and each of the plurality of poppet valve assemblies 130 drives the plurality of poppet valve assemblies 130 between the closed position and the open position. For example, the cam mechanism 144 may have a curved profile, such that, as the cam mechanism 144 is translated into contact with each of the plurality of poppet valve assemblies 130, the cam mechanism 144 may force each of the plurality of poppet valve assemblies 130 to translate upwardly (e.g., in the +y-direction as depicted in FIG. 2). In these embodiments, the upward translation of each of the plurality of poppet valve assemblies 130 may cause the plurality of poppet valve assemblies 130 to disengage the plurality of oil conduits 120 in which the plurality of poppet valve assemblies 130 are disposed, thereby allowing oil to flow through the plurality of poppet valve assemblies. Although the cam mechanism 144 of FIG. 2 is depicted as including a curved profile, it should be appreciated that the cam mechanism 144 may have any shaped profile that allows for actuation of the plurality of poppet valve assemblies 130 described herein.

In the embodiments described herein, it should be understood that the cam mechanism 144 of the shift assembly 140 may contact a single poppet valve assembly of the plurality of poppet valve assemblies at a time. That is, in order to engage the first poppet valve 130a, the cam mechanism 144 may disengage the second poppet valve 130b and the third poppet valve 130c. Accordingly, it should be appreciated that only a single poppet valve of the plurality of poppet valve assemblies may be moved to the open position at a time, while the remaining poppet valves of the plurality of poppet valve assemblies may remain in the closed position.

Figure 3:
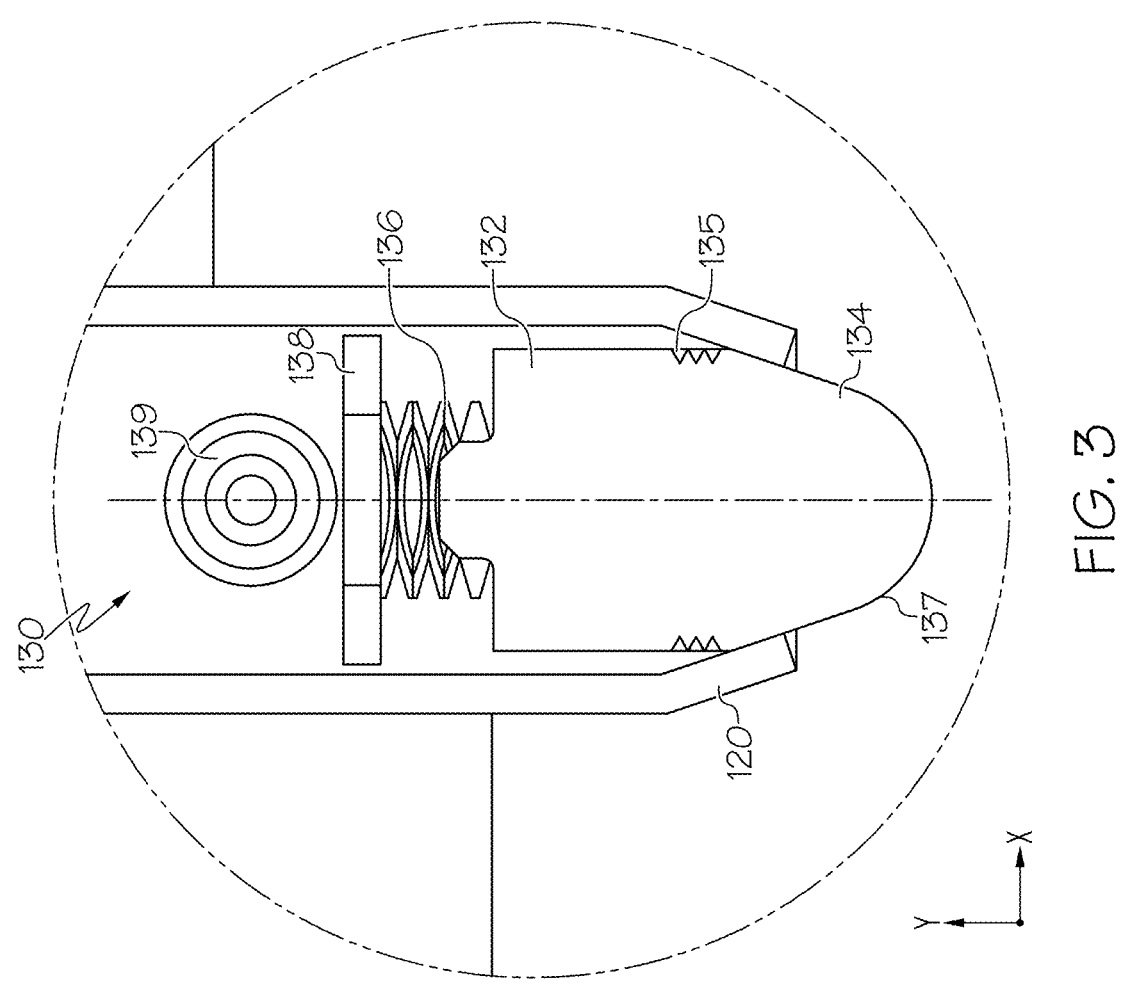
FIG. 3 is a sectional view of a poppet valve assembly of the lubrication system of FIG. 2, according to one or more embodiments shown and described herein.

Referring now to FIG. 3, an exemplary poppet valve of the plurality of poppet valve assemblies 130 is depicted in additional detail. For example, in the embodiments described herein, each of the plurality of poppet valve assemblies 130 may include a body 132 defining a plunger 134. In these embodiments, the plunger 134 of the body 132 of each of the plurality of poppet valve assemblies 130 may further include a tapered (e.g., bull-nose shaped, etc.) end 137 which may be configured to form a seal with the oil conduit 120 in which the poppet valve assembly 130 is disposed when the poppet valve assembly 130 is in the closed position.

As further depicted in FIG. 3, each of the plurality of poppet valve assemblies 130 may further include a spring mechanism 136, such as a wave spring or any other similar spring, which may be configured to apply a constant force to the body 132 of each of the plurality of poppet valve assemblies. In these embodiments, the force exerted by the spring mechanism 136 may ensure that each of the plurality of poppet valve assemblies 130 remain in the closed position (e.g., such that the seal formed between the plunger 134 and the oil conduit 120 remains intact) when not in contact with the shift assembly 140. As further depicted in FIG. 3, the spring mechanism 136 may be disposed between the body 132 and a poppet washer 138 of each of the plurality of poppet valve assemblies 130, such that the force exerted by the spring mechanism 136 in an uncompressed state maintains each of the plurality of poppet valve assemblies 130 in the closed position.

As further depicted in FIG. 3, each of the plurality of poppet valve assemblies 130 may further include a pin 139, such as a roll pin, which may be configured to secure each of the plurality of poppet valve assemblies 130 to the plurality of oil conduits 120. In these embodiments, the pin 139 may be a fixed pin, which may aid in ensuring that the plurality of poppet valve assemblies 130 do not rotate or become dislodged from the plurality of oil conduits 120 during operation of the transmission assembly 10.

In the embodiments described herein, the body 132 and/or plunger 134 of each of the plurality of poppet valve assemblies 130 may further include a plurality of relief cuts 135 configured to allow oil to circumvent the plurality of poppet valves 130 when the plurality of poppet valves are actuated into the open position. It should be appreciated that the plurality of relief cuts 135 may be a plurality of grooves machined into the body 132 and/or plunger 134 of each of the plurality of poppet valve assemblies 130, and may aid in facilitating and channeling oil flow to various components of the transmission assembly 10, as will be described in additional detail herein.

Figure 4:
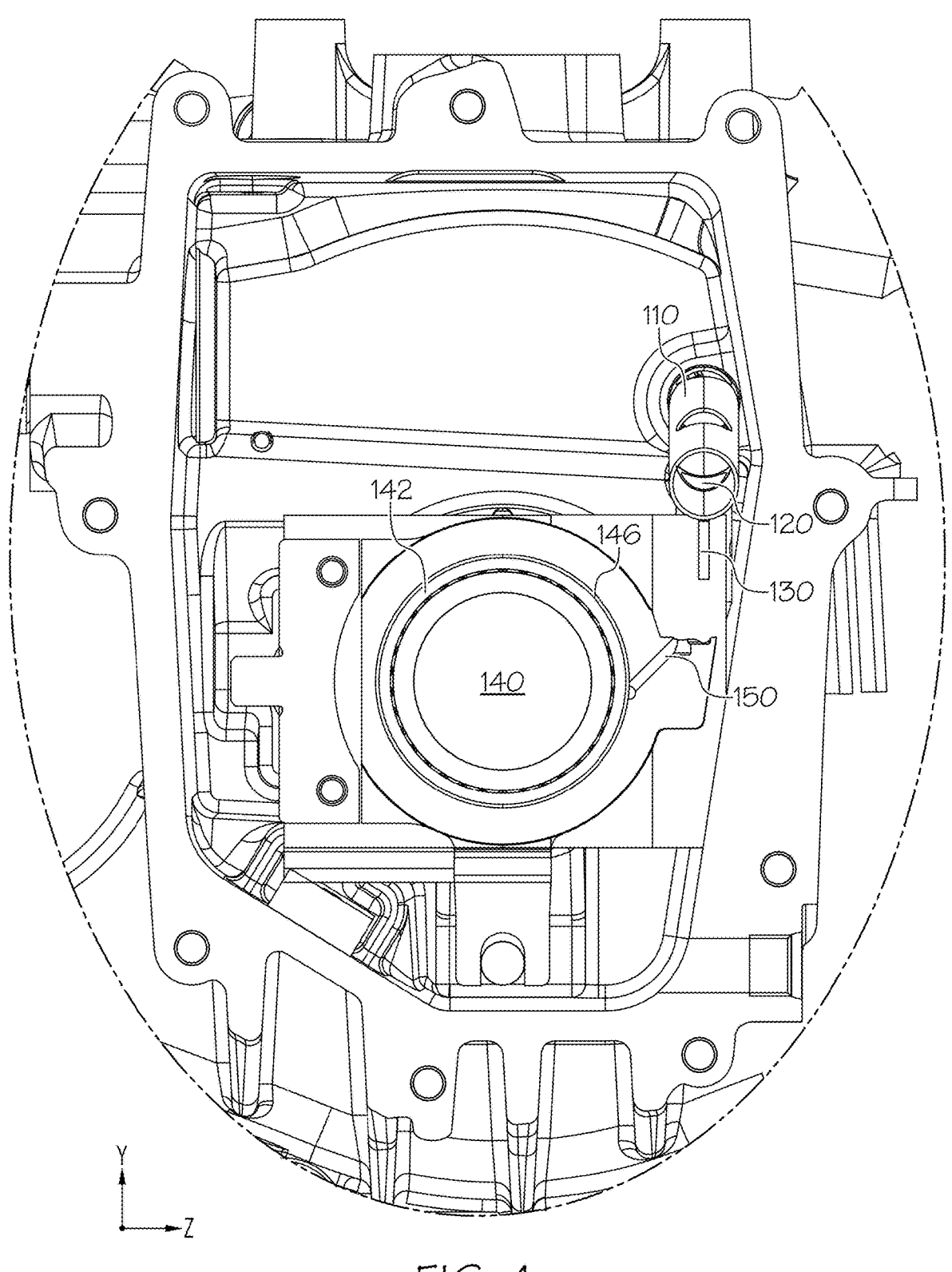
FIG. 4 is a cross-sectional view of the lubrication system of FIG. 1 taken along cross-sectional line 4-4, according to one or more embodiments shown and described herein.

Referring now to FIG. 4, a partial cross-sectional view of the lubrication system 100 is depicted, which illustrates the manner in which oil may flow through the lubrication tube 110 and the plurality of oil conduits 120. For example, as illustrated in FIG. 4, the shift assembly 140 may further define an oil pathway 150, such that, when the plurality of poppet valves 130 are actuated to the open position, oil may flow through the oil conduits 120 and into a plurality of shift bearings 146 via the oil pathway 150. Although FIG. 4 depicts the oil pathway 150 of the shift assembly 140 as directing oil to the plurality of shift bearings 146, it should be appreciated that the oil pathway 150 may be configured to direct oil to any component of the transmission assembly 10 without departing from the scope of the present disclosure.

Referring now to FIGS. 1-4 collectively, operation of the transmission assembly 10 and lubrication system 100 will now be described in additional detail. For example, in these embodiments, the lubrication tube 110 may scavenge oil from at least one of the plurality of gears 32 positioned in the transmission housing 12. In these embodiments, the shift assembly 140 may be disengaged from the plurality of oil conduits 120, such that each of the plurality of poppet valve assemblies is in the closed position.

As oil is scavenged from the at least one of the plurality of gears 32, the scavenged oil may traverse the lubrication tube 110 and collect in each of the plurality of oil conduits 120 at a location that is upstream of each of the plurality of poppet valve assemblies 130. It should be appreciated that oil may be continuously scavenged from the plurality of gears 32 of the transmission assembly 10 during operation of the transmission assembly 10, such that oil may be continuously supplied to each of the plurality of oil conduits 120.

As the transmission assembly 10 is in operation, the shift assembly 140 may be engaged in order to actuate the plurality of poppet valve assemblies 130 positioned in each of the plurality of oil conduits 120 from the closed position to the open position, such that oil accumulated upstream of the plurality of poppet valve assemblies 130 may be allowed to flow through the plurality of oil conduits 120 and be channeled to various components of the transmission assembly 10, such as the plurality of shift bearings 146.

For example, the shift shaft 142 of the shift assembly 140 may be translated such that the cam mechanism 144 of the shift assembly 140 engages the plunger 134 of the first poppet valve 130a disposed within the first oil conduit 120a. In these embodiments, the force exerted by the cam mechanism 144 on the plunger 134 of first poppet valve 130a may cause the body 132 of the first poppet valve 130a to compress the spring mechanism 136 of the first poppet valve 130a, such that the first poppet valve 130a translates upwardly and moves from the closed position to the open position. As the first poppet valve 130a opens, oil accumulated upstream of the first poppet valve 130a may flow downstream through the first oil conduit 120a. As the oil traverses the first oil conduit 120a, the oil may be diverted to at least one of the plurality of shift bearings 146 via the oil pathway 150.

Referring still to FIGS. 1-4, as the shift shaft 142 translates to an adjacent (e.g., second position), the cam mechanism 144 of the shift assembly 140 may disengage the first poppet valve 130a and engage the second poppet valve 130b positioned in the second oil conduit 120b. In these embodiments, as the cam mechanism 144 disengages the first poppet valve 130a, the spring mechanism 136 may return to an initial (e.g., uncompressed) state, which may cause the body 132 and plunger 134 of the first poppet valve 130a to move downwardly from the open position to the closed position. As the first poppet valve 130a moves to the closed position, the plunger 134 of the first poppet valve 130a may engage the first oil conduit 120a, such that a seal is formed between the first poppet valve 130a and the first oil conduit 120a. With the first poppet valve 130a moved to the closed position, scavenged oil traversing the lubrication tube 110 may be accumulated upstream, such that oil is available to be dispensed via the first oil conduit 120a when the shift assembly 140 is returned to an initial position.

It should be appreciated that each of the plurality of poppet valve assemblies 130 may be translated between the closed position and the open position as described herein when the shift assembly 140 is translated to engage each of the plurality of poppet valve assemblies, respectively. Furthermore, the translation of the shift assembly 140 during operation of the transmission assembly 10 may allow for the continuous scavenging and recirculation of oil from the plurality of gears 32 disposed within the transmission housing 12 and to at least the plurality of shift bearings 146 formed in the shift assembly 140.

Referring still to FIGS. 1-4, it should be further appreciated that a method of lubricating a transmission assembly utilizing the lubrication system described herein is also contemplated within the scope of the present disclosure. For example, in embodiments, a method of lubricating a transmission assembly may include scavenging, via the lubrication tube 110, oil from at least one of a plurality of gears 32, and directing the scavenged oil from the lubrication tube 110 to the plurality of oil conduits 120 extending from the lubrication tube 110. As oil traverses the lubrication tube 110 and accumulates within the plurality of oil conduits 120, the method may further involve translating the shift assembly 140 in a longitudinal direction such that the shift assembly 140 actuates the plurality of poppet valve assemblies 130 disposed in the plurality of oil conduits 120 between the closed position and the open position.

As the shift assembly 140 engages the plurality of poppet valve assemblies 130 and actuates the plurality of poppet valve assemblies 130 to the open position, the scavenged oil circumvents the plurality of poppet valve assemblies. As the shift assembly disengages the plurality of poppet valve assemblies 130, the plurality of poppet valve assemblies 130 may return to the closed position, in which the plurality of poppet valve assemblies 130 form a seal with the plurality of oil conduits 120. In the embodiments described herein, it should be further appreciated that the method may further involve directing the scavenged oil from the plurality of oil conduits to a plurality of shift bearings formed within the shift assembly when at least one of the plurality of poppet valve assemblies is moved to the open position.

In view of the foregoing, it should be appreciated that the embodiments described herein relate to transmissions, lubrication systems for transmissions including integrated components, and methods of lubricating transmissions. While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A lubrication system for a transmission assembly comprising:
   a lubrication tube;
   a plurality of oil conduits extending from and in fluid communication with the lubrication tube;
   a plurality of poppet valve assemblies, at least one of the plurality of poppet valve assemblies being disposed in each of the plurality of oil conduits; and
   a shift assembly comprising:
      a shift shaft translatable in a longitudinal direction; and
      a cam mechanism disposed about the shift shaft;
      wherein the cam mechanism of the shift assembly is configured to engage each of the plurality of poppet valve assemblies to actuate each of the plurality of poppet valve assemblies between a closed position and an open position.

2. The lubrication system of claim 1, wherein, in the closed position, each of the plurality of poppet valve assemblies form a seal with the plurality of oil conduits.

3. The lubrication system of claim 1, wherein the shift assembly further defines an oil pathway configured to direct oil from the plurality of oil conduits to a plurality of shift bearings.

4. The lubrication system of claim 1, wherein the cam mechanism includes a curved profile, such that contact between the curved profile of the cam mechanism and each of the plurality of poppet valve assemblies actuated the plurality of poppet valve assemblies between the closed position and the open position.

5. The lubrication system of claim 1, wherein each of the plurality of poppet valve assemblies include a body having a tapered end.

6. The lubrication system of claim 1, wherein each of the plurality of poppet valve assemblies includes a spring mechanism configured to secure the plurality of poppet valve assemblies in the closed position.

7. The lubrication system of claim 1, wherein each of the plurality of poppet valve assemblies further includes a pin configured to secure each of the plurality of poppet valve assemblies within each of the plurality of oil conduits.

8. The lubrication system of claim 1, wherein each of the plurality of poppet valve assemblies further includes a plurality of grooves formed on a body of each of the plurality of poppet valve assemblies.

9. A transmission assembly comprising:
   a transmission housing defining a transmission shaft extending at least partially through the transmission housing;
   a lubrication system disposed within the transmission housing, the lubrication system comprising:
   a lubrication tube in fluid communication with at least one of the plurality of gears;
   a plurality of oil conduits extending from and in fluid communication with the lubrication tube;
   a plurality of poppet valve assemblies, at least one of the plurality of poppet valve assemblies being disposed in each of the plurality of oil conduits; and
   a shift assembly translatable in a longitudinal direction relative the plurality of oil conduits;
   wherein the shift assembly is configured to engage each of the plurality of poppet valve assemblies to actuate each of the plurality of poppet valve assemblies between a closed position and an open position.

10. The transmission assembly of claim 9, further comprising a brake assembly disposed within the transmission shaft.

11. The transmission assembly of claim 10, wherein the brake assembly further includes an e-axle.

12. The transmission assembly of claim 9, wherein the lubrication tube of the lubrication system extends at least partially in parallel with the transmission shaft.

13. The transmission assembly of claim 9, wherein the shift assembly comprises:
   a shift shaft translatable in the longitudinal direction; and
   a cam mechanism disposed about the shift shaft;
   wherein the cam mechanism is configured to engage each of the plurality of poppet valve assemblies.

14. The transmission assembly of claim 9, wherein, in the open position, oil circumvents each of the plurality of poppet valve assemblies, such that oil flows from the lubrication tube to the shift assembly via the plurality of oil conduits.

15. The transmission assembly of claim 9, wherein each of the plurality of poppet valve assemblies include a body having a tapered end, such that the tapered end of each of the plurality of poppet valve assemblies forms a seal with each of the plurality of oil conduits when the plurality of poppet valve assemblies are in the closed position.

16. The lubrication system of claim 9, wherein each of the plurality of poppet valve assemblies includes a spring mechanism configured to secure the plurality of poppet valve assemblies in the closed position.

17. The lubrication system of claim 9 wherein each of the plurality of poppet valve assemblies further includes a pin configured to secure each of the plurality of poppet valve assemblies within each of the plurality of oil conduits.

18. The lubrication system of claim 9, wherein each of the plurality of poppet valve assemblies further includes a plurality of grooves formed on a body of each of the plurality of poppet valve assemblies.

19. A method of lubricating a transmission system, the method comprising:

scavenging, via a lubrication tube of a lubrication system disposed within the transmission system, oil from at least one of a plurality of gears;

12 directing the scavenged oil from the lubrication tube to a plurality of oil conduits extending from the lubrication tube; and translating a shift assembly in a longitudinal direction such that the shift assembly actuates a plurality of poppet valve assemblies disposed in the plurality of oil conduits between a closed position and an open position;

wherein the scavenged oil circumvents the plurality of poppet valve assemblies in the open position and the plurality of poppet valve assemblies form a seal with the plurality of oil conduits in the closed position.

20. The method of claim 19, further comprising translating the plurality of poppet valves assemblies from the closed position to the open position and directing the scavenged oil from the plurality of oil conduits to a plurality of shift bearings formed within the shift assembly.

* * * * *